W. L. PROCUNIER.
REVERSIBLE TAP HOLDER.
APPLICATION FILED JAN. 20, 1915.

1,164,315.

Patented Dec. 14, 1915.

Witnesses:

Inventor:
William L. Procunier.
by Burton & Burton
his Attys.

UNITED STATES PATENT OFFICE.

WILLIAM L. PROCUNIER, OF CHICAGO, ILLINOIS.

REVERSIBLE TAP-HOLDER.

1,164,315.

Specification of Letters Patent.

Patented Dec. 14, 1915.

Application filed January 20, 1915. Serial No. 3,205.

*To all whom it may concern:*

Be it known that I, WILLIAM L. PROCUNIER, a citizen of the United States, residing at Chicago, in the county of Cook and State of Illinois, have invented new and useful Improvements in Reversible Tap-Holders, of which the following is a specification, reference being had to the accompanying drawings, forming a part thereof.

The purpose of this invention is to provide an improved device for driving a screw cutting tap or for holding it when the work is driven relatively to the tap, adapted for reverse driving or for holding the tap when the work is reversely driven, adapted for automatic release within a predetermined number of turns after the relative advance of the work and tap is stopped.

It consists in the elements and features of construction shown and described, as indicated in the claims.

Figure 2:
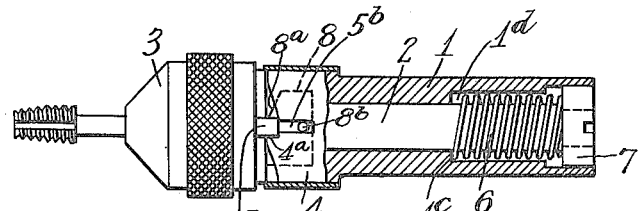
Figure 4:
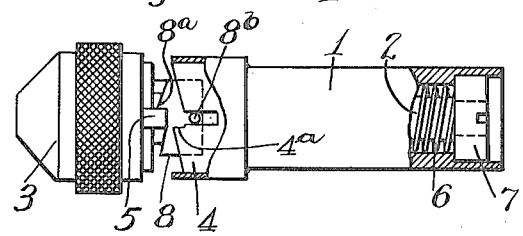
Figure 1:
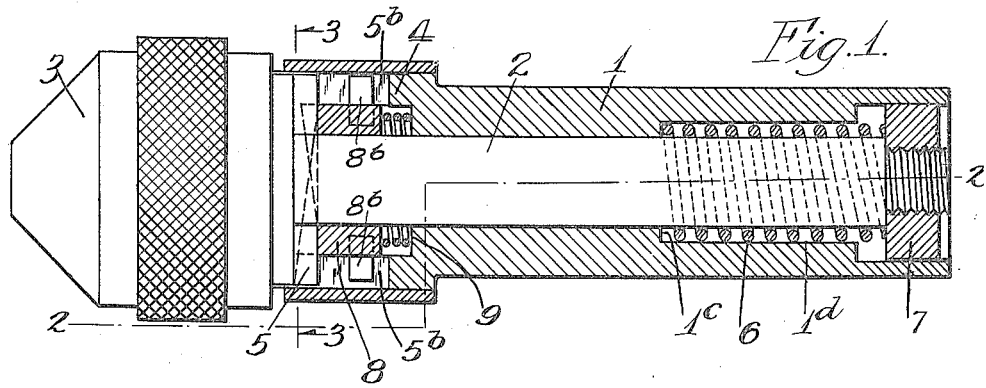
Figure 3:
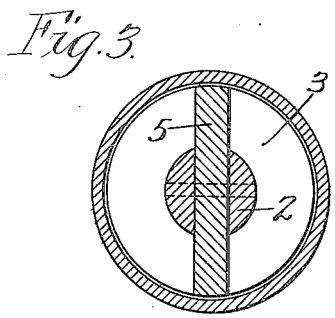
Figure 5:
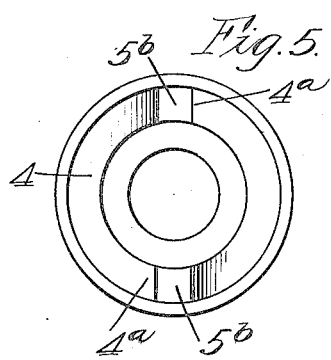
Figure 6:
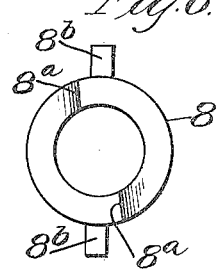

Figure 1 is an axial section of a device embodying this invention. Fig. 2 is a section at the line, 2—2, on Fig. 1. Fig. 3 is a section at the line, 3—3, on Fig. 1. Fig. 4 is a view similar to Fig. 2, showing the parts in the position occupied in the withdrawing movement of the work from the tap. Fig. 5 is an end view of the slot with the removable parts removed therefrom. Fig. 6 is an end view of the ratchet sleeve.

The device shown in the drawings comprises a main stock, 1, which is adapted to be held fixedly in a fixed head of the machine in which the tool is to be used, and a secondary stock, 2, concentric with the stock, 1, extending therethrough, and having at one end beyond the stock, 1, a tap-holding chuck, 3, of any usual form for holding a tap or other tool. The two stocks, 1 and 2, are provided with a ratchet connection adapted to permit the inner stock, 2, to rotate in one direction with respect to the outer stock, but preventing relative rotation in the reverse direction. The ratchet member of this connection is a sleeve, 4, fixed with respect to the stock, 1, at one end thereof, having at the outer end two ratchet teeth, 4ª, 4ª, which are engaged by a diametric spline or feather, 5, on the inner stock, 2, and which is preferably formed as shown, as a key for engaging the inner member of the chuck, 3, with the stock, 2. The stock, 1, is chambered out around the stock, 2, for a portion of the length of each, and in said chamber, 1ᵈ, there is lodged a coiled spring, 6, stopped at one end on the shoulder, 1ᶜ, which is the limit of said chamber, and at the other end against a nut, 7, which is screwed onto the end of the stock, 2, which is threaded for that purpose, and by this means it will be seen the spring is caused to react to thrust the inner stock with respect to the outer stock in direction for causing engagement of the ratchet sleeve of the main stock with the coöperating spline or feather, 5, of the secondary or inner stock, so that the two stocks will be prevented against relative rotation in one direction while such relative rotation of the inner stock with respect to the outer is permitted in the opposite direction. Coaxially disposed with respect to the ratchet sleeve, 4, is a ratchet sleeve, 8, which is mounted free to rotate upon the inner or secondary stock, 2, and has its two ratchet teeth, 8ª, adapted to be engaged with the same spline or feather, 5, which engages the ratchet teeth of the sleeve, 4. Said ratchet sleeve, 4, has the diametrically opposite longitudinal slots or furrows, 5ᵇ, which are engaged by the oppositely protruding studs, 8ᵇ, of the sleeve, 8, permitting the two ratchet sleeves to move relatively to each other along their common axis, but preventing relative rotation of said sleeves. A spring, 9, is coiled about the inner stock, 2, back of the sleeve, 8, to thrust the inner sleeve, 8, longitudinally with respect to the outer sleeve, and hold the ratchet end of said inner sleeve in engagement with the spline or feather, 5, which coöperates with the ratchet teeth of said sleeve for permitting relative rotation in one direction and preventing it in the opposite direction.

The mode of operation of this device is that when the main stock, 1, is mounted rigidly in the turret of a screw lathe, for example, the work to be operated upon being inserted through the center of the revolving head of the lathe and held and revolved therein, while the turret carrying the tool is advanced toward said head according to the customary operation of such a machine, the tap held in the chuck, 3, operates for threading the hole in the work into which it is introduced, so long as the relative advance of the turret and revolving head continues. When the advance of the turret ceases, the continued rotation of the work engaged with the tap while cutting another thread or two, withdraws the chuck and the stock, 2, relatively to the fixed stock, 1, until the spline or feather, 5, clears the driving shoulders of the ratchet teeth of the ratchet sleeve, 4, which is fast with respect to the stock, 1, and thereafter further rotation of the work revolves the tool and the chuck, 3, with the work, so that the tap is not driven any farther or deeper into the work. The operator observing the tap and chuck revolving will reverse the lathe, causing the tap and chuck to make a reverse half revolution which will bring the spline or feather, 5, against the driving shoulders of the ratchet teeth of the inner sleeve, 8, which will thereupon lock the tap and chuck against further rotation in that direction, causing the tap to stand still while the continued reverse rotation of the work will withdraw it from the tap.

I claim:—

1. In combination with two concentric stocks having ratchet engagement with each other, a spring which yieldingly thrusts one with respect to the other for holding them thus engaged; a ratchet sleeve on the inner stock having ratchet teeth facing oppositely to those of the first mentioned ratchet; means on the inner stock for engaging said ratchet sleeve, and a spring which yieldingly thrusts the sleeve along said stock to cause such engagement.

2. In combination with a main stock, a secondary stock co-axial therewith, and rotatable and longitudinally movable with respect thereto; two sleeves co-axially disposed on the secondary stock and engaged for relative movement along and against relative rotation about the same; said sleeves having oppositely facing ratchet teeth, the secondary stock having means for engaging said teeth; a spring which yieldingly holds the inner stock so engaged, the outer sleeve being rigid with the main stock, and a spring which yieldingly holds the secondary stock engaged with the ratchet teeth of the outer sleeve.

In testimony whereof, I have hereunto set my hand at Chicago, Illinois, this 18th day of January, 1915.

WILLIAM L. PROCUNIER.

Witnesses:
CHAS. S. BURTON,
LUCY I. STONE.